United States Patent
Ergin et al.

(10) Patent No.: US 11,881,765 B2
(45) Date of Patent: Jan. 23, 2024

(54) METHOD FOR OPERATING A MODULAR MULTILEVEL CONVERTER, AND MODULAR MULTILEVEL CONVERTER

(71) Applicant: Siemens Energy Global GmbH & Co. KG, Munich (DE)

(72) Inventors: Dominik Ergin, Baiersdorf (DE); Felix Kammerer, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/795,954

(22) PCT Filed: Jan. 28, 2020

(86) PCT No.: PCT/EP2020/052027
§ 371 (c)(1),
(2) Date: Jul. 28, 2022

(87) PCT Pub. No.: WO2021/151469
PCT Pub. Date: Aug. 5, 2021

(65) Prior Publication Data
US 2023/0109050 A1  Apr. 6, 2023

(51) Int. Cl.
*H02M 1/32* (2007.01)
*H02M 7/219* (2006.01)
(Continued)

(52) U.S. Cl.
CPC ............ *H02M 1/325* (2021.05); *H02H 7/125* (2013.01); *H02M 7/219* (2013.01); *H02M 7/4835* (2021.05)

(58) Field of Classification Search
CPC .... H02M 1/325; H02M 7/219; H02M 7/4835; H02H 7/125
See application file for complete search history.

(56) References Cited

U.S. PATENT DOCUMENTS 10,432,109 B2    10/2019  Alvarez Valenzuela et al.
2014/0226374 A1*  8/2014  Hafneer .............. H02M 7/4835
                                                363/35
(Continued)

FOREIGN PATENT DOCUMENTS

CN    107728508 B    11/2019
CN    110635675 A    12/2019
(Continued)

*Primary Examiner* — Jue Zhang
(74) *Attorney, Agent, or Firm* — Laurence A. Greenberg; Werner H. Stemer; Ralph E. Locher

(57) ABSTRACT

A modular multilevel converter includes a plurality of submodules, each having at least two electronic switching elements, an electric energy store, two submodule connections, a bypass switch bridging the submodule, and a communication element communicating with a communication apparatus. A method for operating the modular multilevel converter includes ascertaining that the submodules have a defective submodule so that the communication element in the defective submodule does not communicate with the communication apparatus, determining whether a present arm current resulting from an operating point of the modular multilevel converter is below a predetermined threshold value, and generating or amplifying a converter-internal circular current with the defective submodule if the arm current resulting from the operating point is below the predetermined threshold value. A modular multilevel converter is also provided.

14 Claims, 3 Drawing Sheets

(51) Int. Cl.
*H02M 7/483* (2007.01)
*H02H 7/125* (2006.01)

(56) References Cited

U.S. PATENT DOCUMENTS

2019/0131885 A1* 5/2019 Dorn .................. H02M 1/32
2019/0157968 A1* 5/2019 Tsuchiya ............. H02M 7/12

FOREIGN PATENT DOCUMENTS

| CN | 110677029 A | 1/2020 |
| DE | 102019208509 A1 | 12/2020 |
| WO | WO 2017125134 A1 | 7/2017 |

* cited by examiner

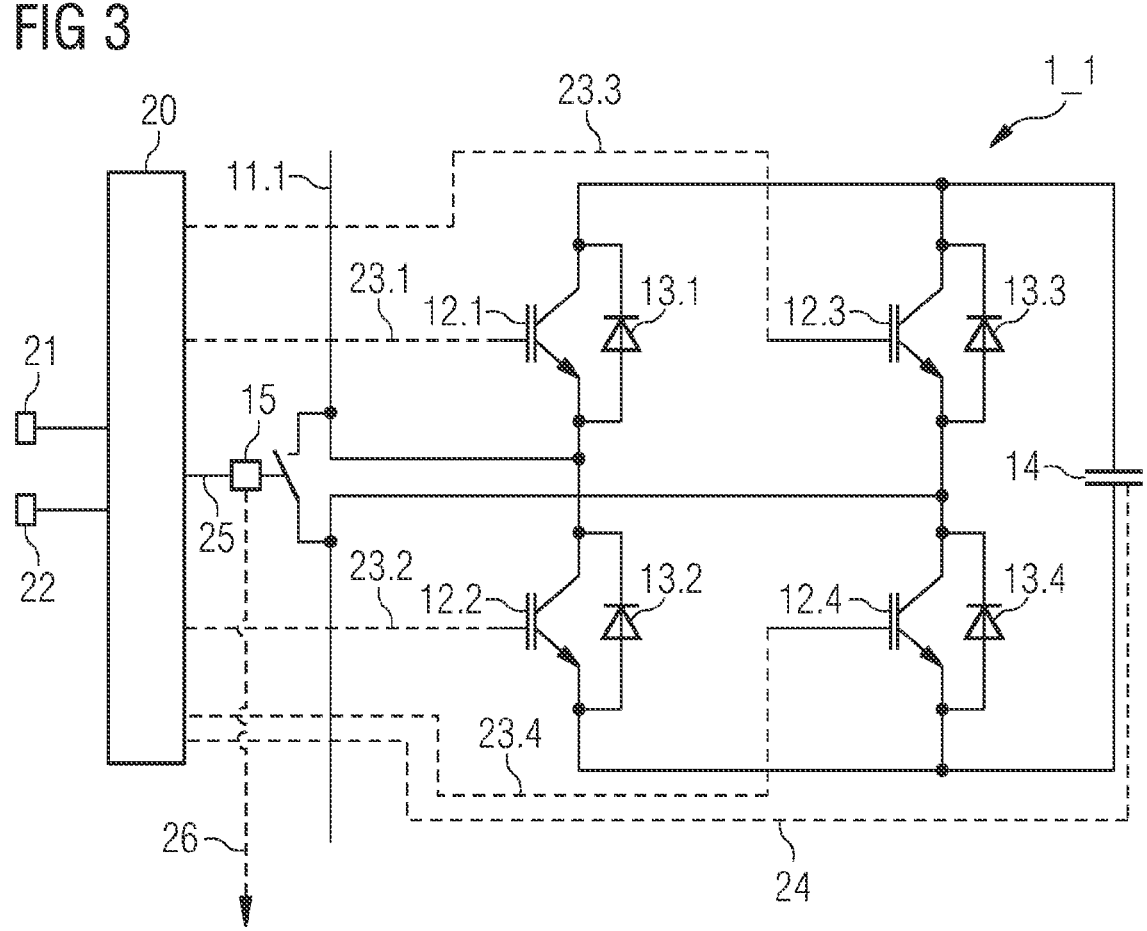

METHOD FOR OPERATING A MODULAR MULTILEVEL CONVERTER, AND MODULAR MULTILEVEL CONVERTER

FIELD AND BACKGROUND OF THE INVENTION

The invention relates to a method for operating a modular multilevel converter, and to a modular multilevel converter.

Converters are power electronic circuits for converting electrical energy. Converters can convert alternating current into direct current, direct current into alternating current, alternating current into alternating current having a different frequency and/or amplitude, or direct current into direct current at a different voltage. Converters can comprise a plurality of submodules of identical type, which can be electrically connected in series. Each of these submodules has at least two electronic switching elements and an electrical energy store. Such converters are referred to as modular multilevel converters (for short: MMC or M2C).

By electrically connecting the submodules in series, it is possible to attain high output voltages. The modular multilevel converters are easily adaptable (scalable) to different voltages and a desired output voltage can be generated relatively accurately. Modular multilevel converters are often used in the high-voltage field, for example as converters for high-voltage direct current transmission systems (for short: HVDC) or as reactive power compensators for flexible alternating current transmission systems (FACTS).

In modular multilevel converters, one challenge consists, inter alia, in how defective submodules are dealt with.

In general, in the case of a failure of a single submodule of the modular multilevel converter, a shutdown of the entire system supplied with current cannot be accepted. Therefore, the defective submodule has to be transferred to a safe state during normal operation and is exchanged only when the system is next shut down in regular fashion.

In order to enable continued operation even with defective submodules, all of the submodules can be equipped with a bypass switch, which can bridge the respective submodule. Said bypass switch can be installed between the submodule connections (or connection terminals) of the submodule. The system current can thus flow via the defective submodule without causing damage to the modular multilevel converter, in particular as a result of arcs arising.

One criterion for the closing of the bypass switch may be that if a threshold value of the capacitor voltage of a capacitor in the submodule is exceeded, the submodule independently performs the closing of the bypass switch (this may also be referred to as bypass switch threshold). As a result, the submodule is bridged and protected against a further charging. The logic necessary for this can be installed on the submodule and operate autonomously from the rest of the control of the submodule.

This trigger criterion can be used to cope with a large proportion of the fault situations since many fault scenarios can lead to the blocking of the defective submodule directly, that is to say as a result of the fault occurrence itself, or indirectly, that is to say as a result of a reaction of the converter control. If the submodule is blocked, control signals are no longer sent to the switching elements of the submodule or the power electronics of the submodule are turned off.

If a submodule is blocked, then it can only be charged by way of freewheeling diodes of the electronic switching elements of the submodule. Discharging is no longer possible. If the system continues to be operated, the submodule is thus inevitably charged by the branch current that flows. The blocking of a submodule during operation thus leads to the closing of the bypass switch.

This self-protection of the submodules functions even in the event of failure of communication between the submodules and a communication device or control device of the modular multilevel converter. Specifically, if the affected submodule no longer receives communication messages from the communication device, then it blocks itself. If communication messages from the relevant submodule are no longer received in the converter controller, then a command for blocking the submodule is transmitted.

Since the bypass switch cannot be tested 100% in regard to function during operation, it is only in the case of a fault of the submodule that the fact of whether said bypass switch is functioning is revealed. Consequently, the scenario of failure of a bypass switch has to be taken into consideration. In this case, an undefined current flow through the submodule, i.e. an arc, should be expected, which can damage the system. Consequently, the system must be shut down in the case of failure of the bypass switch.

In order to ensure that the bypass switch is closed, each submodule can have a facility for monitoring the bypass switch. For a large proportion of the faults of submodules, the communication device or control device thus receives from the submodule the feedback as to whether the bypass switch is closed or open. However, this is no longer possible in the case of failure of communication. Consequently, if failure of communication with a submodule and failure of the bypass switch occur at the same time, this cannot be recognized by the communication device or control device.

If the system is not shut down in this case, then the system current would charge the relevant submodule further and further until failure of isolation would occur at a location. Subsequently, an arc would form and the system current would flow in an undefined manner via this fault location. Even if such an arc is detected by an optical monitoring facility in a converter hall, the consequence is inevitably major damage to the system.

Even in the case of relatively low current, it should be expected that an arc will emerge from the submodule after a few seconds and thus lead to damage in the system.

For safe handling of the fault scenario described above, the closing of the bypass switch can be monitored not only by the relevant submodule itself, but also by another submodule, for instance a neighboring submodule. Two neighboring submodules in each case can thus form a pair that mutually monitors itself. If one submodule fails with a communication fault, then the closing of the relevant bypass switch is detected by its neighboring submodule and communicated to the communication device or control device.

In order that failure of a bypass switch can be reliably detected by such a bypass switch closing monitoring facility, a temporal charging of the faulty, blocked submodule must be taken into account. It is only if the bypass switch threshold was exceeded that the fact of whether the bypass switch in the faulty submodule is functioning is revealed.

If a submodule is blocked and is charged by the flowing system current, then depending on the operating point of the system it may possibly take a very long time for the capacitor voltage to exceed the threshold value for the closing of the bypass switch. If the system is e.g. currently in no-load operation or at low power, the charging may possibly have a duration of tens of seconds. Excessively long waiting for the charging and the associated closing of the bypass switch cannot be accepted, however, since the arc must be expected to emerge from the submodule after a time duration of a few seconds. Consequently, the detection of the failure of a bypass switch must take place in this time.

In order that it is possible to detect failure of a bypass switch even at low power or in no-load operation of the system in the prior art, a minimum system current must be ensured during operation. A minimally present current flow via the submodules is thus present, thereby ensuring that the bypass switch threshold is reached after a certain time.

The above-described solution for detecting failure of the bypass switch requires a minimum current flow via the submodules. This current flow causes significant additional losses at low power or in no-load operation, which leads to an increase in the operating costs of the system.

SUMMARY OF THE INVENTION

It is therefore an object of the invention at least in part to reduce the disadvantages of methods for operating modular multilevel converters known from the prior art, in particular to provide an operating method that is particularly cost-effective and makes it possible particularly reliably to detect failure of a bypass switch.

The above object is achieved by means of the subjects of the patent claims, in particular by means of a method for operating a modular multilevel converter as described below and by means of a modular multilevel converter as described below. Further advantages and details of the invention are evident from the dependent claims, the description and the drawings. In this case, features and details disclosed in association with the method according to the invention are also applicable, of course, in association with the modular multilevel converter according to the invention, and so with regard to the disclosure concerning the individual aspects of the invention, reference always is or can be made reciprocally.

In accordance with a first aspect, the stated object is achieved by means of a method for operating a modular multilevel converter comprising a plurality of submodules, each of which has at least two electronic switching elements, an electrical energy store, two submodule connections, a bypass switch for bridging its submodule (1, 2, 3, 4, 5, 6) in the modular multilevel converter, and a communication element for communication with a communication device of the modular multilevel converter, the method comprising the following steps:
  (a) ascertaining that the plurality of submodules have a submodule which is defective such that the communication element in the defective submodule does not communicate with the communication device,
  (b) determining whether a present arm current resulting from an operating point of the modular multilevel converter is below a predetermined threshold value, and
  (c) generating or amplifying an internal circulating current in the modular multilevel converter with the defective submodule if the arm current resulting from the operating point of the modular multilevel converter is below the predetermined threshold value of the operating point.

Consequently, the solution provided envisages that a converter-internal circulating current is generated as necessary. The losses in no-load operation can be significantly reduced as a result. Furthermore, it is possible to generate as necessary circulating currents that are significantly greater than the previous minimum system currents or converter currents or currents in the modular multilevel converter. A defective submodule can thus be charged significantly faster by means of the method provided, as a result of which the failure of a bypass switch becomes detectable faster and the probability of a fault manifestation with an arc is significantly reduced.

The operating point and the arm current resulting therefrom can be determined by means of the active power and reactive power in relation to a DC voltage side or an AC voltage power supply system of the modular multilevel converter. The arm current is the current that flows through a phase module branch of a phase module of the modular multilevel converter. Said arm current is composed of a direct current component and an alternating current component. The direct current component of the arm current is dependent on the exchange of active power with the DC voltage side. The alternating current component is dependent on the exchange of power (active and reactive power) with the AC voltage side. A plurality of submodules are connected in series with one another in the phase module branch. The phase module branches are each connected to an AC voltage side and a DC voltage side. Two phase module branches in each case form a phase module here. Accordingly, the threshold value is determined by a magnitude or amplitude of a minimum current intensity of the arm current flowing through the modular multilevel converter. The threshold value can be chosen in such a way that the arm current suffices for charging the electrical energy store in a blocked submodule in a short time period, such that the bypass switch of this submodule is closed in the short time period.

The electronic switching elements of the submodules can be embodied as turn-off semiconductor valves, in particular as transistors, very particularly as insulated gate bipolar transistors. A semiconductor diode, in particular a freewheeling diode, can in each case be connected in antiparallel with each of the electronic switching elements.

The electrical energy stores of the submodules can be embodied as capacitors.

The bypass switches of the submodules can be arranged in particular between the two submodule connections of the respective submodule. The submodule connections can be embodied as clamping connections.

Submodules of the plurality of submodules can be connected in series with one another by means of the submodule connections. A plurality of submodules connected in series with one another can be combined to form a phase module branch. Two phase module branches interconnected with one another in each case can be combined to form a phase module.

It is preferred for the internal circulating current to flow in the defective submodule. The internal circulating current can be injected or generated or amplified in particular in addition to a current, in particular three-phase current, flowing at an operating point of the modular multilevel converter. Furthermore, the converter-internal circulating current can be generated or amplified if the modular multilevel converter is in no-load operation. Internal or converter-internal circulating currents involve a current flow between phase modules, in particular the three phase modules, of the modular multilevel converter that does not lead to an exchange of power with an AC voltage side or a DC voltage side of the modular multilevel converter.

It is also preferred for the defective submodule to be blocked before generating or amplifying the internal circulating current in the modular multilevel converter with the defective submodule, as a result of which the electrical energy store of the defective submodule is charged by means of the internal circulating current. Upon the blocking of the defective submodule, the electronic switching elements are no longer driven or power electronics of the submodule are switched off. Consequently, the current of the modular multilevel converter in accordance with its operating point and/or the converter-internal circulating current flow(s) through the defective submodule, in particular via the freewheeling diodes, to the electrical energy store and charge the latter. In this case, the blocking can be triggered directly by way of the occurrence of the defect of the submodule itself or indirectly as a result of a reaction of a control device of the modular multilevel converter.

In this case, it is preferred for the bypass switch of the blocked defective submodule to be closed in order to bridge the blocked defective submodule in the modular multilevel converter if the electrical energy store of the blocked defective submodule has reached a predetermined charging by means of the internal circulating current. The predetermined charging of the electrical energy store can be a maximum charging of the electrical energy store or correspond to the maximum voltage of the electrical energy store. Consequently, this is regarded as a simple trigger criterion for closing the bypass switch if a defective submodule is blocked.

It can be provided that for example an equivalent charging current of the electrical energy store in the defective submodule is used when determining whether the arm current of the modular multilevel converter that results from the operating point is below the predetermined threshold value of the operating point. The equivalent charging current can be used to make a statement about how much of the arm current flowing at the operating point arrives at the electrical energy store as equivalent charging current if the submodule is blocked. The equivalent charging current can be determined approximately.

In the case of a modular multilevel converter comprising half-bridge modules as submodules, the equivalent DC charging current $i_{DC\_BPS}$ can be determined approximately by means of the following formula:

$$i_{DC\_BPS} = \frac{i_{sec\_rms}}{\pi \cdot \sqrt{2}} + \frac{i_d}{6}$$

where $i_{sec\_rms}$ is the root-mean-square value of a secondary-side AC current of the modular multilevel converter and id is a present DC current (with sign).

In the case of a modular multilevel converter comprising full-bridge modules as submodules, the equivalent DC charging current $i_{DC\_BPS}$ can be determined approximately by means of the following formula:

$$i_{DC\_BPS} = \frac{i_{sec\_rms} \cdot \sqrt{2}}{\pi}$$

where $i_{sec\_rms}$ is the root-mean-square value of a secondary-side AC current of the modular multilevel converter.

Alternatively or additionally, the arm current resulting from the operating point of the modular multilevel converter can be looked up in a look-up table in order to determine whether the arm current of the modular multilevel converter resulting from the operating point is below the predetermined threshold value of the arm current, and in particular in order to determine the magnitude, frequency and/or phase angle of the internal circulating current. For this purpose, a magnitude, frequency and/or phase angle of the internal circulating current can be stored in the look-up table for each arm current resulting from the operating point of the modular multilevel converter (in particular on the basis of the P-Q diagram).

It is further preferred for each submodule of the plurality of submodules to be connected to a bypass switch of another submodule of the plurality of submodules in terms of communication technology by means of a respective communication element in order in each case to monitor the state of a bypass switch of each submodule of the plurality of submodules by means of another submodule in each case, generating or amplifying the circulating current in the modular multilevel converter with the defective submodule being effected if furthermore the communication element of a submodule which monitors the defective submodule and which is connected to the bypass switch of the defective submodule in terms of communication technology communicates with the communication device. The state of the bypass switch can accordingly be open or closed. In the open state of the bypass switch, current flows through the defective submodule. In the closed state of the bypass switch, the defective submodule is bridged. The connections in terms of communication technology can be embodied by means of optical waveguides, for example. In particular, submodules in a pair of submodules can mutually monitor one another. Consequently, one submodule of the pair can be interconnected by means of a communication element with the bypass switch of the other submodule of the pair, and vice versa. The submodules of the pair of submodules can be neighboring submodules in order to shorten the communication paths.

In this case, it is additionally preferred for generating or amplifying the internal circulating current in the modular multilevel converter with the defective submodule to be effected if furthermore the communication element of the submodule which monitors the defective submodule communicates to the communication device the fact that the bypass switch of the defective submodule is open. It is then not yet established whether or not the bypass switch is functional since the electrical energy store has possibly not yet been charged sufficiently to close the bypass switch. In order then as fast as possible to close the bypass switch and to provide certainty about whether the bypass switch is functional, the converter-internal circulating current must be generated or amplified if the arm current resulting from the operating point of the modular multilevel converter is below the predetermined threshold value.

Furthermore, it is also preferred in this case that after a predefined time duration of the flowing of the generated or amplified internal circulating current in the modular multilevel converter with the defective submodule, by means of the submodule which monitors the defective submodule, a check is made to establish whether the bypass switch in the defective submodule is closed. Specifically, the bypass switch would have to be closed after the predefined time duration of the flowing of the internal circulating current.

If this is the case, the bypass switch has functioned, and so the defective submodule was bridged and can be exchanged upon the next stoppage or the next maintenance.

In this case, it is in turn preferred for the predefined time duration to be set depending on the current intensity and/or the voltage of the generated or amplified internal circulating current. In this respect, the time duration can be chosen depending on the current intensity and/or the voltage in order to optimize current consumption, safety and reliability.

Moreover, it is preferred in this case that the modular multilevel converter with the defective submodule is switched off if the submodule which monitors the defective submodule, after the predefined time duration has elapsed, communicates by means of its communication element to the communication device the fact that the bypass switch of the defective submodule is open. Specifically, if the bypass switch is still open, this allows the conclusion to be drawn that the bypass switch is defective, and so it is then necessary to initiate the shutdown of the modular multilevel converter in order to avoid damage that is possible otherwise.

Moreover, it is preferred that a magnitude, frequency and/or phase angle of the internal circulating current in the modular multilevel converter with the defective submodule are/is set depending on the arm current resulting from the operating point of the modular multilevel converter. The look-up table mentioned above can be used for this purpose. Consequently, the energy consumption of the modular multilevel converter can be optimized by setting the degrees of freedom of magnitude, frequency and/or phase angle of the internal circulating current. If the modular multilevel converter is running in no-load operation, for example, a high internal circulating current is generated. By contrast, if the modular multilevel converter is running for example with a partial load below the predetermined threshold value for the arm current, a lower internal circulating current by comparison therewith is generated since the current flowing in total is then nevertheless high enough that damage to the modular multilevel converter can be prevented with similar or identical reliability.

In this case, it is preferred that the threshold value (of the arm current) has been or is predetermined in such a way that closing of the bypass switch in the blocked defective submodule has a duration of at most 10 seconds, in particular at most 7 seconds when the modular multilevel converter is operated at the threshold value. This makes it possible for a defect of the bypass switch to be established even before formation of an arc in the defective submodule usually occurs, which would lead to damage to the modular multilevel converter.

Moreover, it is preferred for the submodules to be embodied as half-bridge modules and/or as full-bridge modules. In this case, it is possible for the modular multilevel converter to comprise only half-bridge modules, only full-bridge modules or both half-bridge modules and full-bridge modules.

In accordance with a second aspect, the object stated in the introduction is achieved by means of a modular multilevel converter according to the features of the first aspect of the invention, wherein the modular multilevel converter is configured for carrying out the method in accordance with the first aspect of the invention.

Accordingly, the modular multilevel converter comprises a plurality of submodules, each of which has at least two electronic switching elements, an electrical energy store, two submodule connections, a bypass switch for the bridging thereof in the modular multilevel converter, and a communication element for communication with a communication device of the modular multilevel converter.

In particular, the modular multilevel converter can furthermore comprise a control device. The control device can comprise the communication device or can be connected thereto in terms of communication technology. The control device can be configured for carrying out the operations of the modular multilevel converter, that is to say for example setting the operating point of the modular multilevel converter, turning off the modular multilevel converter, but also blocking a defective submodule and generating or amplifying the internal circulating current in the modular multilevel converter. Consequently, in particular, the control device can be configured for carrying out the method in accordance with the first aspect of the invention.

Further measures that improve the invention will become apparent from the following description concerning various exemplary embodiments of the invention which are illustrated schematically in the figures. All features and/or advantages emerging from the claims, the description or the figures, including design details and spatial arrangements, may be essential to the invention both by themselves and in the various combinations.

The invention is explained in greater detail below with reference to the accompanying drawings.

BRIEF DESCRIPTION OF THE FIGURES

FIG. 3 shows a schematic view of a full-bridge module in the modular multilevel converter from FIG. 1.

DETAILED DESCRIPTION OF THE INVENTION

Figure 1:
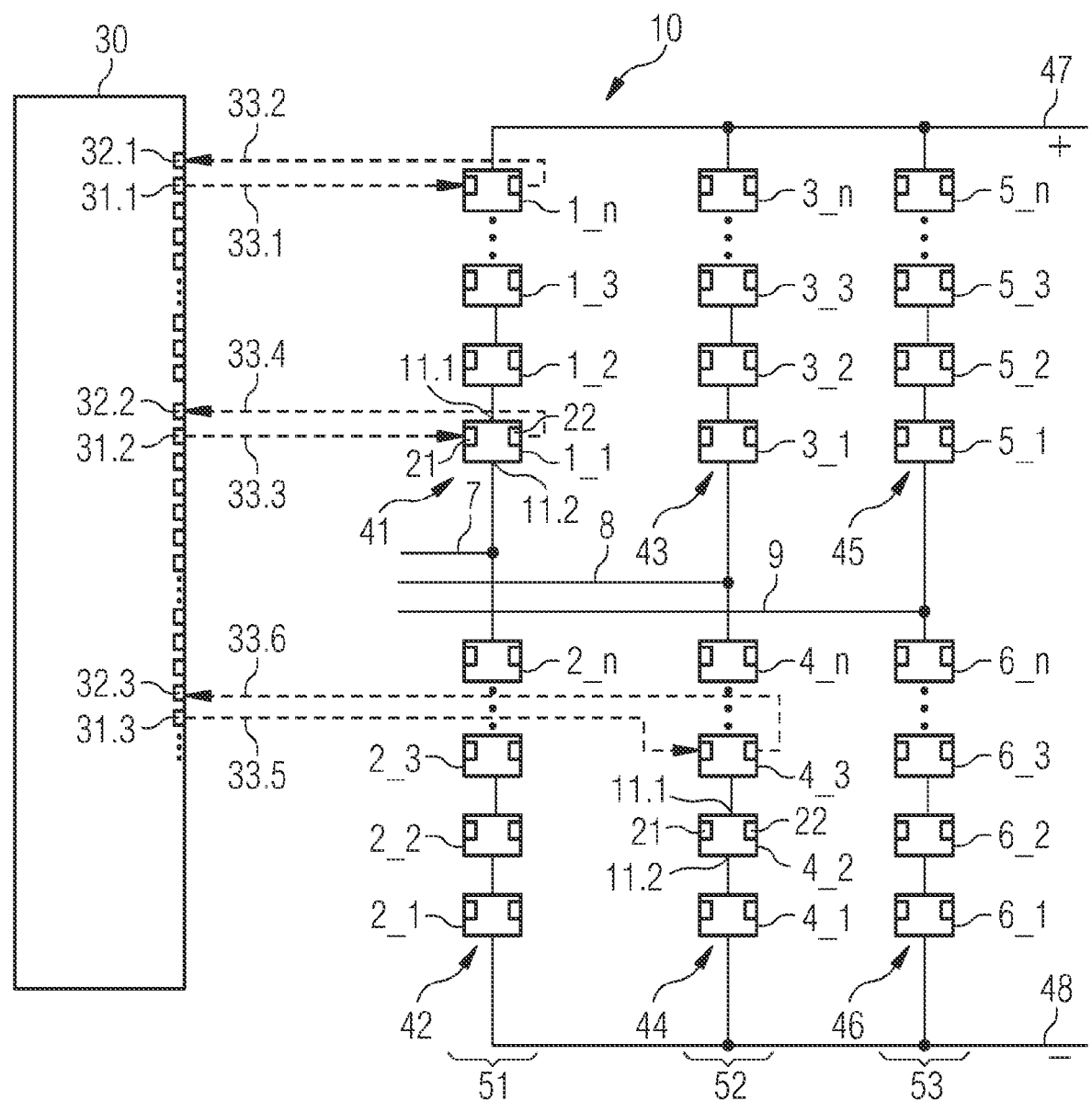
FIG. 1 shows a schematic view of a circuit diagram of a modular multilevel converter in accordance with one exemplary embodiment of the invention.
Figure 2:
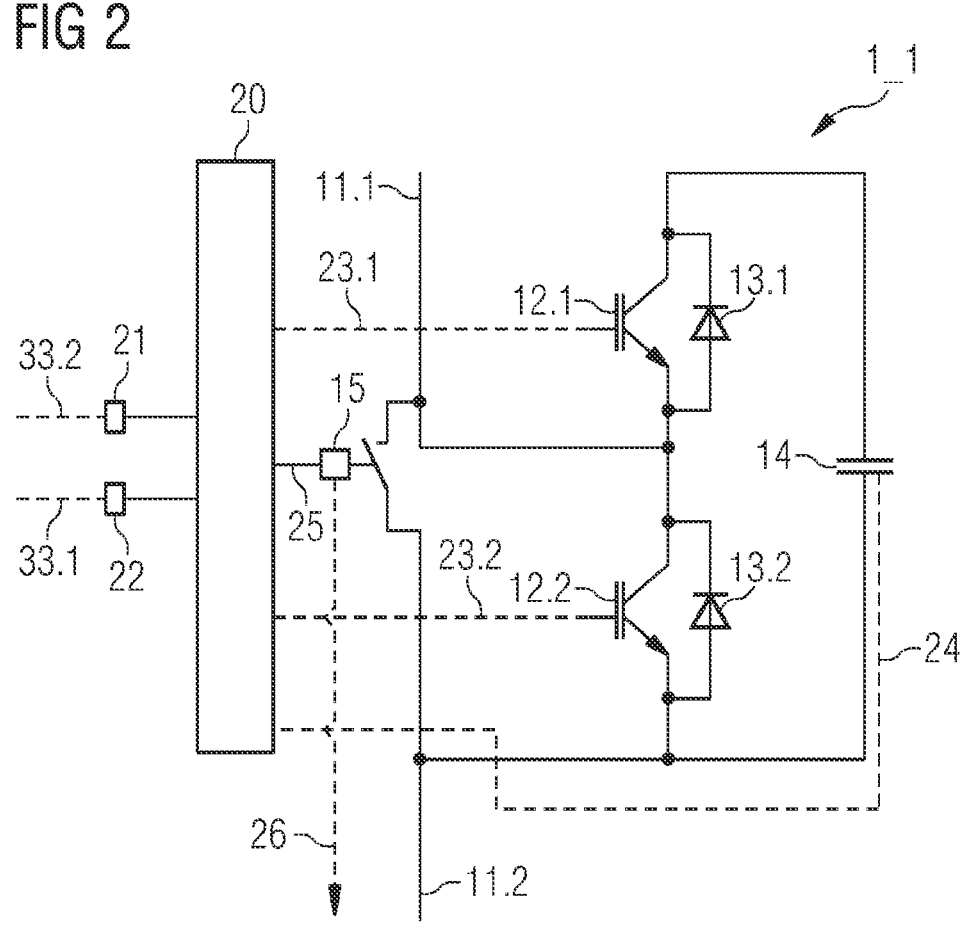
FIG. 2 shows a schematic view of a half-bridge module in the modular multilevel converter from FIG. 1.

Elements having an identical function and mode of operation are in each case provided with the same reference signs in FIGS. 1 to 3. A plurality of identical elements in a FIG. are provided with consecutive numbering, the consecutive numbering being separated from its reference sign by a dot or an underscore.

FIG. 1 shows a schematic view of a circuit diagram of a modular multilevel converter 10 in accordance with one exemplary embodiment of the invention.

The modular multilevel converter 10 comprises a first AC voltage connection 7, a second AC voltage connection 8 and a third AC voltage connection 9. The first AC voltage connection 7 is electrically connected to a first phase module branch 41 and a second phase module branch 42. The first phase module branch 41 and the second phase module branch 42 form a first phase module 51 of the modular multilevel converter 10.

That end of the first phase module branch 41 which faces away from the first AC voltage connection 7 is electrically connected to a first DC voltage connection 47. That end of the second phase module branch 42 which faces away from the first AC voltage connection 7 is electrically connected to a second DC voltage connection 48. The first DC voltage connection 47 is a positive DC voltage connection and the second DC voltage connection 48 is a negative DC voltage connection.

The second AC voltage connection 8 is electrically connected to an end of a third phase module branch 43 and to an end of a fourth phase module branch 44. The third phase module branch 43 and the fourth phase module branch 44 form a second phase module 52.

The third AC voltage connection 9 is electrically connected to an end of a fifth phase module branch 45 and to an end of a sixth phase module branch 46. The fifth phase module branch 45 and the sixth phase module branch 46 form a third phase module 53.

That end of the third phase module branch 43 which faces away from the second AC voltage connection 8 and that end of the fifth phase module branch 45 which faces away from the third AC voltage connection 9 are electrically connected to the first DC voltage connection 47. That end of the fourth phase module branch 44 which faces away from the second AC voltage connection 8 and that end of the sixth phase module branch which faces away from the third AC voltage connection 9 are electrically connected to the second DC voltage connection 48.

Each phase module branch 41, 42, 43, 44, 45, 46 comprises a plurality of submodules (1_1, 1_2, 1_3, ... 1_n; 2_1 ... 2_n, etc.) which are electrically connected in series, in particular by means of their submodule connections 11.1, 11.2 (see FIGS. 2 and 3). An arm current resulting from the operating point of the modular multilevel converter 10 flows in each of the phase module branches 41, 42, 43, 44, 45, 46. The operating point and the arm current resulting therefrom are determined from the active power and the reactive power in relation to the DC voltage connections 47, 48 and the AC voltage connections 7, 8, 9 of the modular multilevel converter 10.

In this exemplary embodiment, each phase module branch 41, 42, 43, 44, 45, 46 comprises n submodules 1_1 to 6_n. The number of submodules 1_1 to 6_n electrically connected in series can be different; at the very least two submodules 1_1 to 6_n are connected in series, but it is also possible for example for at least 50 or at least 100 submodules 1_1 to 6_n to be electrically connected in series. In this exemplary embodiment, n=36. The first phase module branch 41 thus comprises 36 submodules 1_1, 1_2, 1_3, ... 1_36.

A communication device 30 of the modular multilevel converter 10 for the submodules 1_1 to 6_n is illustrated schematically in the left-hand region of FIG. 1. The communication device 30 can also be embodied as a control device or a control device can comprise the communication device 30. The communication device 30 transfers optical messages to the individual submodules 1_1 to 6_n.

The message transfer between the control device 30 and a submodule 1_1 to 6_n is illustrated in each case by a dashed line 33, the direction of the message transfer being symbolized by the arrowheads on the dashed lines 33. In the present case, the communication is effected by first optical waveguides 33.1, 33.12, 33.3, 33.4, 33.5, 33.6, which are shown by means of the dashed lines. The communication device transmits optical messages to the submodules 1_1 to 6_n by means of second communication outputs 31.1, 31.2, 31.3, in the present case optical outputs, and receives optical messages from the individual submodules by means of second communication inputs 32.1, 32.2, 32.3, in the present case optical inputs. This is illustrated on the basis of the example of the submodules 1_1, 1_n and 4_3; in the same way, optical messages are transmitted to the other submodules 1_1 to 6_n and received from these submodules 1_1 to 6_n.

FIG. 2 shows a schematic view of a submodule 1_1 embodied as a half-bridge module in the modular multilevel converter from FIG. 1.

This can be for example the submodule 1_1 of the first phase module branch 41 (or else any of the other submodules illustrated in FIG. 1). The submodule 1_1 is configured as a half-bridge module 1_1. The submodule 1_1 comprises a first electronic switching element 12.1 in the form of a turn-off semiconductor valve with a first diode 13.1 connected in antiparallel. Furthermore, the submodule 1_1 comprises a second electronic switching element 12.2 in the form of a turn-off semiconductor valve with a second diode 13.2 connected in antiparallel, and also an electrical energy store 14 in the form of a capacitor. The electronic switching elements 12.1, 12.2 are each embodied as insulated gate bipolar transistors.

The first electronic switching element 12.1 is electrically connected in series with the second electronic switching element 12.2. A first submodule connection 11.1 is arranged at a connection point between the two electronic switching elements 12.1, 12.2. A second submodule connection 11.2 is arranged at the opposite connection of the second electronic switching element 12.2 with respect to said connection point. The second submodule connection 11.2 is furthermore connected to a first connection of the electrical energy store 14. A second connection of the energy store 14 is electrically connected to the opposite connection of the first submodule connection 12.1 with respect to the connection point.

The energy store 14 is thus electrically connected in parallel with the series circuit formed by the electronic switching elements 12.1, 12.2. What can be achieved by corresponding driving of the electronic switching elements 12.1, 12.2 by a drive circuit (not shown) with a submodule-internal communication element 20 is that between the first submodule connection 11.1 and the second submodule connection 11.2 either the voltage of the energy store 14 is output or no voltage is output (i.e. a zero voltage is output). A respectively desired output voltage of the modular multilevel converter 10 can thus be generated by way of the interaction of the submodules of the individual phase module branches 41, 42, 43, 44, 45, 46.

A bypass switch 15 is arranged between the submodule connections 11.1, 11.2. If the bypass switch 15 is closed, the current flows via the closed bypass switch 15 instead of to the electronic switching elements 12.1, 12.2 and the electrical energy store 14.

For submodule-external communication, the submodule 1_1 has a first communication input 21, in the present case an optical input, and a first communication output 22, in the present case an optical output. The communication element 20 is connected to the first communication input 21 and the first communication output 22. For submodule-external communication, first optical waveguides 33.1, 33.2 are respectively connected to the first communication input 21 and the second communication output 22, said optical waveguides respectively being connected to one of the second communication outputs 31 and second communication inputs 32. As a result, the drive circuit and the communication element 20 can detect states of the submodule 1_1 and report them to the communication device 30.

The first communication input 21 of the submodule 1_1 forwards the messages arriving at it to the communication element 20. The communication element 20 outputs (changed or unchanged) messages at the first communication output 22 of the submodule 1_1.

Furthermore, the electronic switching elements 12.1, 12.2 are connected to the communication element 20 by means of second optical waveguides 23.1, 23.2 in order for example to communicate to the communication device 30 a status regarding the electronic switching elements 12.1, 12.2 (blocked or not blocked) or to receive from the communication device 30 a message that the electronic switching elements 12.1, 12.2 are intended to be blocked.

The submodule 1_1 is connected to the electrical energy store 14 in terms of communication technology by means of the third optical waveguide 24. As a result, the drive circuit and the communication element 20 can detect the state of charge of the electrical energy store 14 and report it to the communication device 30.

Furthermore, the bypass switch 15 is connected to the communication element 20 by means of a fourth optical waveguide 25. As a result, the communication element 20 can change and/or query the state of the bypass switch 15, i.e. whether the latter is closed or open. In particular, the bypass switch 15 can be closed if the submodule 1_1 is blocked and the electrical energy store 14 is fully charged.

In addition, a fifth optical waveguide 26 leads away from the bypass switch 15 to outside the submodule 1_1. This fifth optical waveguide 26 leads to a communication element 20 of a submodule 1_2 neighboring the submodule 1_1. By means of the neighboring submodule 1_2, it is thereby possible to check whether or not the bypass switch 15 is closed, even if communication between the communication device 30 and the communication element 20 of the submodule 1_1 fails, provided that the communication between the communication device 30 and the communication element 20 of the neighboring submodule 1_2 is functioning.

FIG. 3 shows a schematic view of a full-bridge module 1_1 in the modular multilevel converter from FIG. 1.

By comparison with the half-bridge module from FIG. 2, the submodule 1_1 embodied as a full-bridge module comprises four electronic switching elements 12.1, 12.2, 12.3, 12.4 and also four diodes 13.1, 13.2, 13.3, 13.4. It is distinguished by the fact that upon corresponding driving of the four electronic switching elements 12.1, 12.2, 12.3, 12.4 between the first submodule connection 11.1 and the second submodule connection 11.2, optionally either the positive voltage of the energy store 14, the negative voltage of the energy store or a voltage of value zero (zero voltage) can be output. Consequently, the polarity of the output voltage can thus be reversed by means of the full-bridge module. The modular multilevel converter 10 from FIG. 1 can comprise either only half-bridge modules, only full-bridge modules or else half-bridge modules and full-bridge modules.

REFERENCE SIGNS

1 First submodule
2 Second submodule
3 Third submodule
4 Fourth submodule
5 Fifth submodule
6 Sixth submodule
7 First AC voltage connection
8 Second AC voltage connection
9 Third AC voltage connection
10 Modular multilevel converter
11 Submodule connection
12 Electronic switching element
13 Diode
14 Electrical energy store
15 Bypass switch
20 Communication element
21 First communication input
22 First communication output
23 Second optical waveguide
24 Third optical waveguide
25 Fourth optical waveguide
26 Fifth optical waveguide
30 Communication device
31 Second communication output
32 Second communication input
33 First optical waveguide
41 First phase module branch
42 Second phase module branch
43 Third phase module branch
44 Fourth phase module branch
45 Fifth phase module branch
46 Sixth phase module branch
47 First DC voltage connection
48 Second DC voltage connection
51 First phase module
52 Second phase module
53 Third phase module

The invention claimed is:

1. A method for operating a modular multilevel converter, the method comprising:
   providing a modular multilevel converter including a communication device, a plurality of submodules each having at least two electronic switching elements, an electrical energy store, two submodule connections, a bypass switch for bridging the submodule in the modular multilevel converter, and a communication element for communication with the communication device of the modular multilevel converter;
   (a) ascertaining that the plurality of submodules include a defective submodule preventing the communication element in the defective submodule from communicating with the communication device;
   (b) determining whether a present arm current resulting from an operating point of the modular multilevel converter is below a predetermined threshold value; and
   (c) generating or amplifying an internal circulating current in the modular multilevel converter with the defective submodule when the arm current resulting from the operating point of the modular multilevel converter is below the predetermined threshold value.

2. The method according to claim 1, which further comprises causing the internal circulating current to flow through the electrical energy store of the defective submodule.

3. The method according to claim 1, which further comprises blocking the defective submodule before generating or amplifying the internal circulating current in the modular multilevel converter, resulting in the electrical energy store in the defective submodule being charged by the internal circulating current.

4. The method according to claim 3, which further comprises closing the bypass switch of the blocked defective submodule in order to bridge the blocked defective submodule in the modular multilevel converter when the electrical energy store of the blocked defective submodule has reached a predetermined charging by the internal circulating current.

5. The method according to claim 1, which further comprises:
   connecting each submodule of the plurality of submodules to a bypass switch of another submodule of the plurality of submodules in terms of communication technology by using a respective communication element in order to monitor a state of a bypass switch of each respective submodule of the plurality of submodules by using another respective submodule; and
   generating or amplifying the circulating current in the modular multilevel converter with the defective submodule when the communication element of a submodule monitoring the defective submodule and being connected to the bypass switch of the defective submodule in terms of communication technology communicates with the communication device.

6. The method according to claim 5, which further comprises generating or amplifying the internal circulating current in the modular multilevel converter with the defective submodule when the communication element of the submodule monitoring the defective submodule communicates to the communication device that the bypass switch of the defective submodule is open.

7. The method according to claim 6, which further comprises after a predefined time duration of flowing of the generated or amplified internal circulating current in the modular multilevel converter with the defective submodule, using the submodule monitoring the defective submodule to perform a check to establish whether the bypass switch in the defective submodule is closed.

8. The method according to claim 7, which further comprises setting the predefined time duration in dependence on a current intensity of the generated or amplified internal circulating current in the modular multilevel converter.

9. The method according to claim 7, which further comprises switching off the modular multilevel converter with the defective submodule when the submodule monitoring the defective submodule, after the predefined time duration has elapsed, uses its communication element to communicate to the communication device that the bypass switch of the defective submodule is open.

10. The method according to claim 1, which further comprises setting at least one of a magnitude, a frequency or a phase angle of the internal circulating current in the modular multilevel converter with the defective submodule in dependence on the arm current resulting from the operating point of the modular multilevel converter.

11. The method according to claim 1, which further comprises blocking the defective submodule before generating or amplifying the internal circulating current in the modular multilevel converter having the defective submodule.

12. The method according to claim 11, which further comprises predetermining a threshold value of the arm current resulting from the operating point in order to close the bypass switch in the blocked defective submodule for a duration of at most 10 seconds when the modular multilevel converter is operated at the threshold value.

13. The method according to claim 1, which further comprises providing the submodules as at least one of half-bridge modules or full-bridge modules.

14. A modular multilevel converter configured for carrying out the method according to claim 1.

\* \* \* \* \*